UNITED STATES PATENT OFFICE.

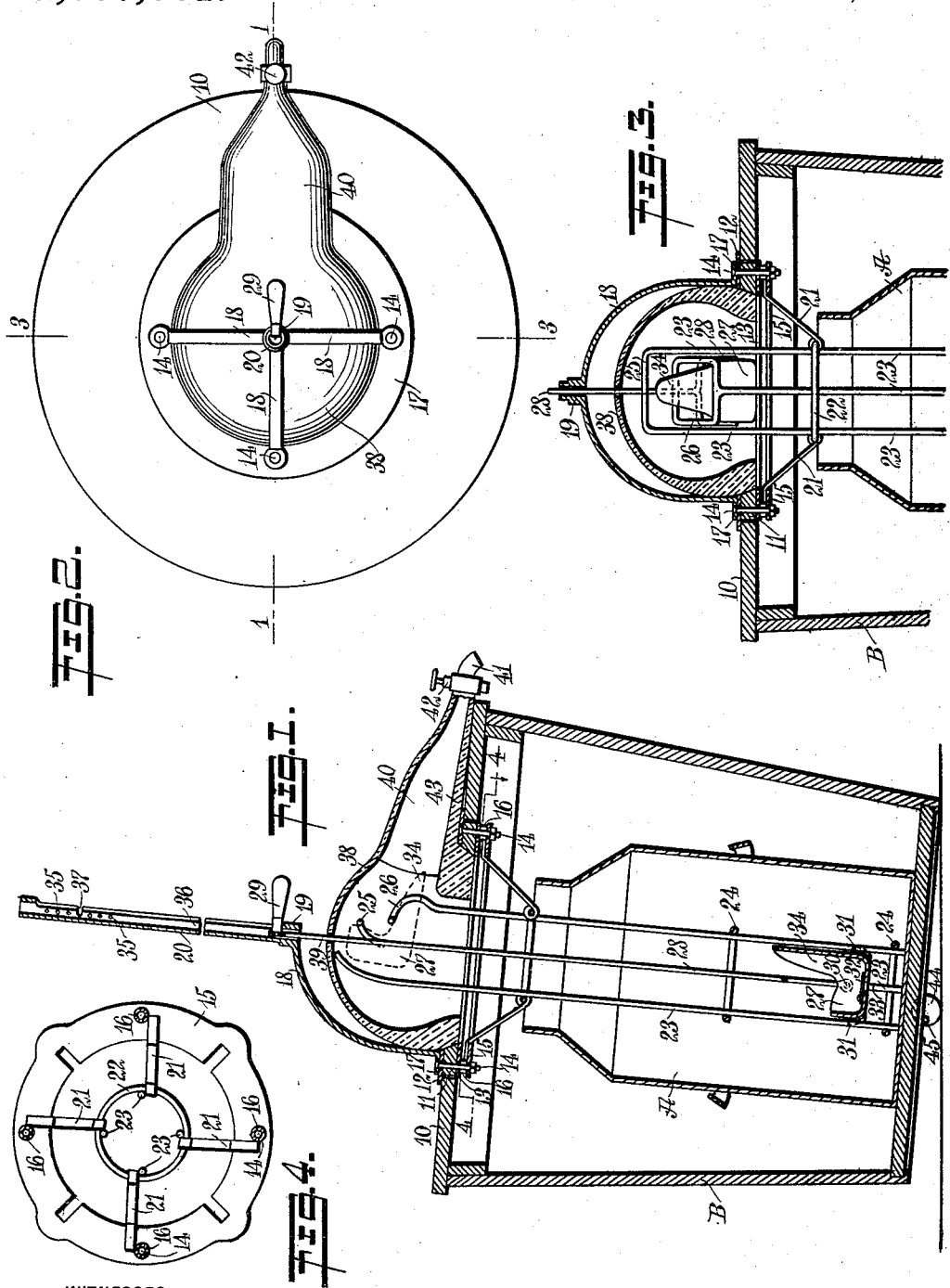

WALTER STELLARD, OF NEW YORK, N. Y., ASSIGNOR TO UNIVERSAL PAPER BOTTLE COMPANY, A CORPORATION OF DELAWARE.

MILK-VENDING APPARATUS.

1,007,501.   Specification of Letters Patent.   Patented Oct. 31, 1911.

Application filed September 10, 1910. Serial No. 581,364.

*To all whom it may concern:*

Be it known that I, WALTER STELLARD, a citizen of the United States, and a resident of the city of New York, borough of Manhattan, in the county and State of New York, have invented a new and Improved Milk-Vending Apparatus, of which the following is a full, clear, and exact description.

Among the principal objects which the present invention has in view are: to provide an apparatus whereby milk or other liquid may be delivered in measured quantities from a reservoir or tank without the liquid contained in the apparatus coming in contact with the person of the operator; to provide an apparatus for dispensing milk or similar liquid constructed and arranged to be made and maintained sanitary; and to provide a simple, economical and efficient means for dispensing milk.

One embodiment of the present invention is presented in the structure illustrated in the accompanying drawings, in which like characters of reference indicate corresponding parts in all the views, and in which—

Figure 1 is a vertical cross section, taken on the line 1—1 in Fig. 2, of a milk can and a cooling tub therefor, being provided with a dispensing apparatus constructed and arranged in accordance with the present invention; Fig. 2 is a top view of the same; Fig. 3 is a vertical cross section taken on the line 3—3 in Fig. 2; and Fig. 4 is a detailed view in section, taken on the line 4—4 in Fig. 1, showing the guide rods and suspension means therefor.

The apparatus shown in the accompanying drawings is principally designed for employment in stores or stands where milk is sold in small quantities and served in glass or taken away in cans. In such establishments the milk can A is disposed in a tub B, which tub is provided for cooling water or cracked ice. The tub, in the present instance, is provided with a cover 10. The cover 10 is provided with a single perforation to receive a ring 11. The ring 11 is supported in the perforation in the cover 10 by a flat ring 12. The ring 12 and a ring 13 operate as clamping rings for the ring 11 and are held thereon by bolts 14, 14. The bolts 14, 14 are elongated to pass through a collar at 15, which is shaped similar to the ring 13 and spaced apart therefrom by washers 16, 16. The bolts 14 are headed and seated in perforations formed in the feet 17, 17 of the spider or supporting frame 18. The members of the supporting frame 18 converge and form a perforated head 19. Extended vertically above the head 19 is a guide rod 20.

Mounted in the space between the collar 15 and the ring 13 are the arms 21, 21. The arms 21 are curled upon the caging ring 22. Fixedly secured to the caging ring are upright guide rods 23, 23. The guide rods 23, 23 are maintained in parallel arrangement, substantially shown in Fig. 1 of the drawings, by the caging ring 22 and the lower caging rings 24, 24. The rods 23, 23 are fixedly secured to the rings 22, 24 and 24. Two of the rods 23 are connected at the top to form a fender bar 25, which extends across the upper end of the guide frame. Upon one of the said rods and at the upper end thereof is formed a loop 26. The loop 26 and the fender bar are juxtaposed substantially as shown in Figs. 1 and 3 of the drawings.

Mounted between the rods 23, 23 and guided thereon is a dipper 27. The dipper 27 is pivotally mounted in a bail loop at the end of a lifting rod 28. The lifting rod 28 extends upward through the perforation formed in the head 19 of the spider 18. The lifting rod is there provided with a screw-threaded perforation adapted to receive a lifting handle 29, whereby the said lifting rod and dipper supported thereby are raised and lowered. The dipper 27 is pivotally mounted at 30 upon the said rod and is provided with guide extensions 31, 31 to infold two of the said rods 23. The dipper is provided in the bottom thereof with an opening normally closed by a gravity valve 32. The valve 32 is provided with a stem 33 which is extended below the bottom of the dipper 27 to impinge upon the bottom of the can A. The dipper 27 when raised to the upper end of the rods 23, 23 is tilted to deliver the contents thereof. The opening through which the dipper is lifted is preferably enlarged, which necessitates the elongation of the nose 34 of the said dipper. The sides of the nose 34 are cam-shaped, substantially as shown in Fig. 1 of the drawings, to ride within the loop 26 to be caught and held thereby. The effect of the engagement of the nose 34 by the loop 26 is to rotate the dipper 27 on the pivot 30 to dispose the said dipper in the position shown in dotted lines at the upper end of the rods 23, as shown in Fig. 1 of the drawings. It is to regulate the tilt of the dipper 27 that there is provided at the upper end of the guide rod 20 a series of perforations 35, 35. The perforations 35, 35 are thus arranged to receive any suitable device, not shown in the drawings, which when extended across the groove 36 formed in the rod 20 limits the same, to prevent the further lifting of the handle 29 and the rod 28 carried thereby. By limiting the lift of the rod 28, the tilt of the dipper 27 is limited. The extent of the limitation of the tilt of the dipper 27 regulates the quantity of liquid which will flow from the said dipper when in tilted position. Thus there may be delivered from a pint dipper subdivisions of a pint measure; for instance, if the bolt is placed in the lower most perforation 35 the apparatus is so arranged that the dipper 27 will be tilted sufficiently to pour therefrom the eighth of the contents of the dipper; if the bolt is placed in the second perforation then the quantity dispensed will be a quarter of a pint or a gill. At the half pint mark is provided, in the side of the groove 36, a recess 37. When the handle 29 is turned to engage the recess 37 the dipper is tilted to deliver one-half of its contents or a half a pint, if the dipper be a pint dipper.

The ring 11 is provided to form a seat for a glass dome 38. The dome 38 is shaped substantially as shown in the drawings and is provided at the apex of the dome with a perforation 39, to pass the rod 28. The dome 38 is provided with a laterally extended passage 40, at the outer end whereof is formed a pouring spout 41, normally closed by a plug valve 42. The bottom 43 of the passage 40 is normally inclined so that the liquid poured on the surface thereof flows to the spout 41.

When in operation the tub is tilted forward, as shown in Fig. 1, or backward in the reverse of the position. When tilted backward the angle of the tub is sufficient to cause the liquid to flow backward through the passage 40, to be therefrom delivered within the can A.

In the operation of the invention the operator handles the valve 42 and the handle 29 of the rod 28 only, therefore, the milk or other liquid is not in danger of contamination from contact with the person of the operator.

Having thus described my invention, I claim as new and desire to secure by Letters Patent:

1. A milk vending apparatus, comprising a cooling receptacle arranged to hold a milk can; a cover for said receptacle having mounted thereon a vitreous pouring receptacle; a dipper; a guide rack for said dipper; a lifting rod for said dipper pivotally connected therewith, said rod being extended upward through said vitreous receptacle; and means for tilting said dipper to empty into said pouring receptacle.

2. A milk vending apparatus, comprising a cooling receptacle arranged to hold a milk can; a cover for said receptacle having mounted thereon a vitreous pouring receptacle; a dipper; a guide rack for said dipper; a lifting rod for said dipper pivotally connected therewith, said rod being extended upward through said vitreous receptacle; and means for regulating the extent of the tilt of said dipper.

3. A milk vending apparatus, comprising a cooling receptacle arranged to hold a milk can; a cover for said receptacle having supported thereon a vitreous pouring receptacle; a dipper having an elongated handle extending through said pouring receptacle arranged to reach the bottom of said milk can and having a pouring spout extending above the body of said dipper, and a guide rack for said dipper shaped at the upper end thereof to engage said spout to tilt the said dipper to empty the contents carried by the same into said pouring receptacle.

4. A milk vending apparatus, comprising a cooling receptacle adapted to hold a milk can; a cover for said receptacle having supported thereon in fixed relation a pouring receptacle having a non-porous inner surface and a dome-shaped chamber; a dipper having a cylindrical body portion and an elongated spout extended from the side thereof; a handle for said dipper pivotally connected therewith and extended upward through the said pouring receptacle; and a tripping member disposed in said dome to engage the said spout to tilt the said dipper, said spout extending into the outlet of said pouring receptacle when the said dipper is tilted.

5. A milk vending apparatus, comprising a cooling receptacle adapted to hold a milk can; a cover for said receptacle having supported thereon in fixed relation a pouring receptacle having a non-porous inner surface and a dome-shaped chamber; a dipper having a cylindrical body portion and an elongated spout extended from the side thereof; a handle for said dipper pivotally connected therewith and extended upward through the said pouring receptacle; a tripping member disposed in said dome to engage the said spout to tilt the said dipper when said dipper is lifted to the limit of its raised position, said spout extending into the outlet of said pouring receptacle; and a gage to regulate the lift of said dipper and the handle therewith connected.

6. A milk vending apparatus, comprising a cooling receptacle adapted to hold a milk can; a cover for said receptacle having supported thereon in fixed relation a pouring receptacle having a non-porous inner surface and a dome-shaped chamber; a dipper having a cylindrical body portion and an elongated spout extended from the side thereof; a handle for said dipper pivotally connected therewith and extended upward through the said pouring receptacle; a tripping member disposed in said dome to engage the said spout to tilt the said dipper when said dipper is lifted to the limit of its raised position, said spout extending into the outlet of said pouring receptacle; a frame mounted above said dome and rigidly secured to said cover; a grooved guide rod for said handle mounted on said frame; and means adjustable in said guide rod for limiting the lift of said handle.

7. A milk vending apparatus, comprising a guide frame adapted to extend within a milk can; a dipper slidably mounted in said guide frame, said dipper having a pouring spout elongated to extend beyond the said frame when said dipper is tilted; and a tripping section of said frame arranged to engage the said pouring spout to tilt the dipper to emptying position.

8. A milk vending apparatus, comprising a guide frame adapted to extend within a milk can; a dipper slidably mounted in said guide frame, said dipper having a valve closed bottom orifice and a pouring spout elongated to extend beyond the said frame when said dipper is tilted; a tripping section of said frame arranged to engage said pouring spout to tilt the dipper to emptying position; and a gravity seated valve operatively mounted in said bottom orifice.

In testimony whereof I have signed my name to this specification in the presence of two subscribing witnesses.

WALTER STELLARD.

Witnesses:
E. F. MURDOCK,
P. D. ROLLHAUS.

Copies of this patent may be obtained for five cents each, by addressing the " Commissioner of Patents, Washington, D. C."